United States Patent
Peterson et al.

(10) Patent No.: US 9,474,997 B1
(45) Date of Patent: Oct. 25, 2016

(54) METAL-ORGANIC FRAMEWORK SORBENTS HAVING HIERARCHICAL PORE STRUCTURE AND METHOD OF MAKING THE SAME

(71) Applicant: U.S. Army Edgewood Chemical and Biological Command, Washington, DC (US)

(72) Inventors: Gregory W Peterson, Belcamp, MD (US); Jared B. DeCoste, Baltimore, MD (US); Tyler J Demasky, Glen Burnie, MD (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 36 days.

(21) Appl. No.: 14/662,357

(22) Filed: Mar. 19, 2015

Related U.S. Application Data

(60) Provisional application No. 61/968,592, filed on Mar. 21, 2014.

(51) Int. Cl.
*B01D 53/04* (2006.01)
*B01J 20/22* (2006.01)
*B01J 20/28* (2006.01)

(52) U.S. Cl.
CPC .............. *B01D 53/04* (2013.01); *B01J 20/226* (2013.01); *B01J 20/28092* (2013.01); *B01D 2253/204* (2013.01); *B01D 2253/308* (2013.01); *B01D 2253/31* (2013.01); *B01D 2257/2025* (2013.01); *B01D 2257/30* (2013.01)

(58) Field of Classification Search
CPC ............ B01D 53/04; B01D 2253/204; B01D 2253/308; B01D 2253/31; B01D 2257/2025; B01D 2257/30; B01D 2257/408; B01J 20/226; B01J 20/28069; B01J 20/2808; B01J 20/28083; B01J 20/28088; B01J 20/28092
USPC ................... 95/90, 131, 132, 128, 135, 139; 502/401
See application file for complete search history.

(56) References Cited

U.S. PATENT DOCUMENTS

| | | | | |
|---|---|---|---|---|
| 2009/0062498 | A1* | 3/2009 | Matzger ................. | B01D 53/02 528/9 |
| 2014/0087163 | A1* | 3/2014 | Landskron ............. | B01D 53/02 428/219 |
| 2014/0212944 | A1* | 7/2014 | Tian ....................... | B82Y 30/00 435/180 |
| 2015/0158012 | A1* | 6/2015 | Ramanathan .......... | B01J 20/226 95/96 |

OTHER PUBLICATIONS

Zhang, Da-Shuai, Fluorous Metal-Organic Frameworks with Enhanced Stability and High H2/CO2 Storage Capacities, Sci. Rep 3, 3312, doi: 10/1038/srep03313 (2013).

* cited by examiner

*Primary Examiner* — Frank Lawrence
(74) *Attorney, Agent, or Firm* — Ulysses John Biffoni

(57) ABSTRACT

This invention is directed to a porous sorbent comprising a modified metal-organic framework (MOF) having a hierarchical pore structure. The MOF is modified by plasma-enhanced chemical vapor deposition with air, fluorocarbons, or other sources of fluorine. In preferred embodiments the MOFs are zirconium based. The modified MOF, while surprisingly retaining its crystal structure, comprises a mixture of micropores and mesopores and embedded fluorine atoms.

23 Claims, 10 Drawing Sheets

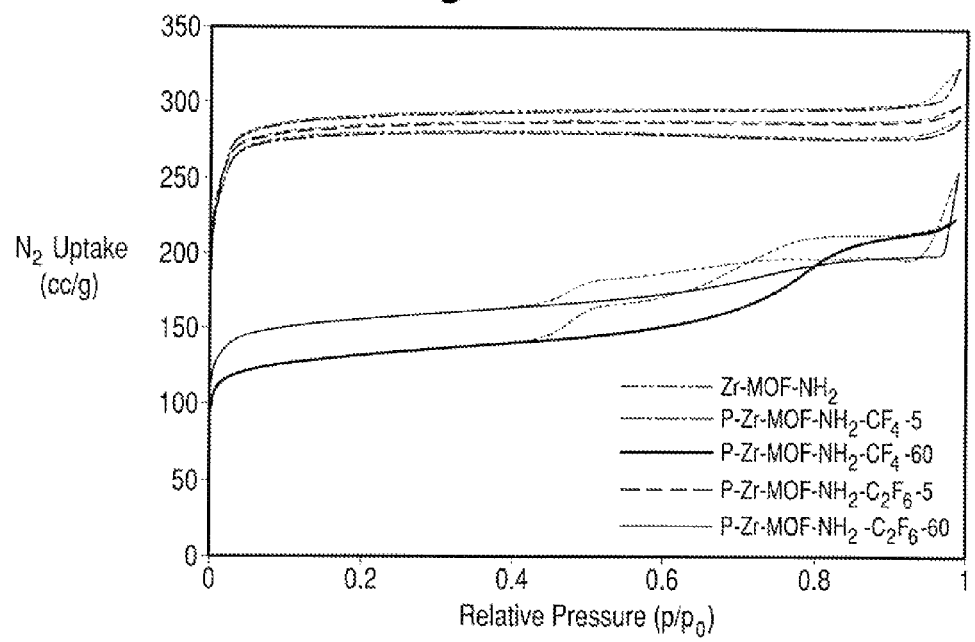
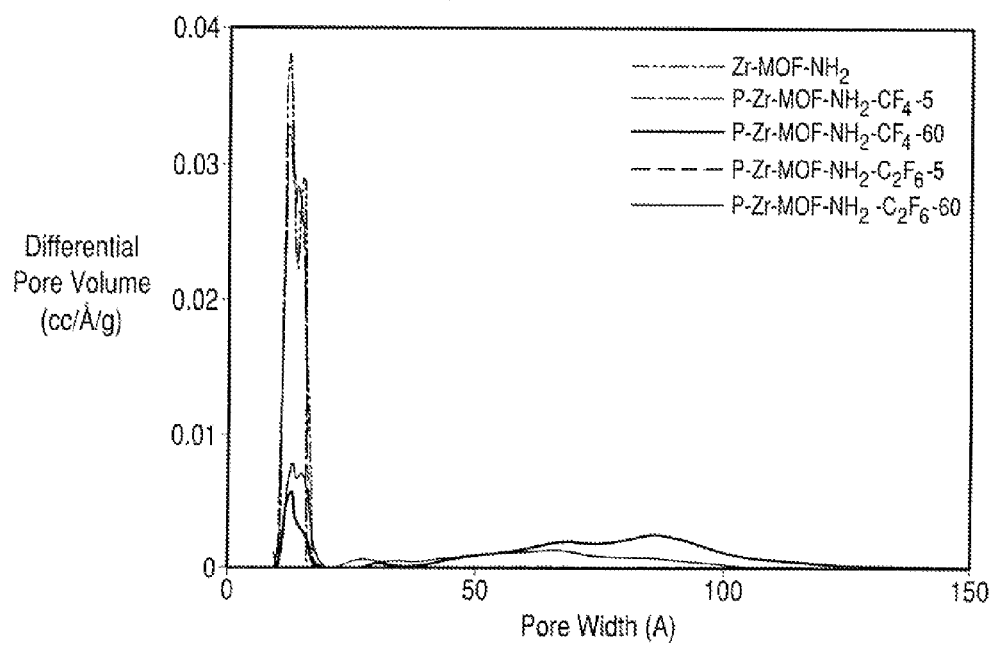

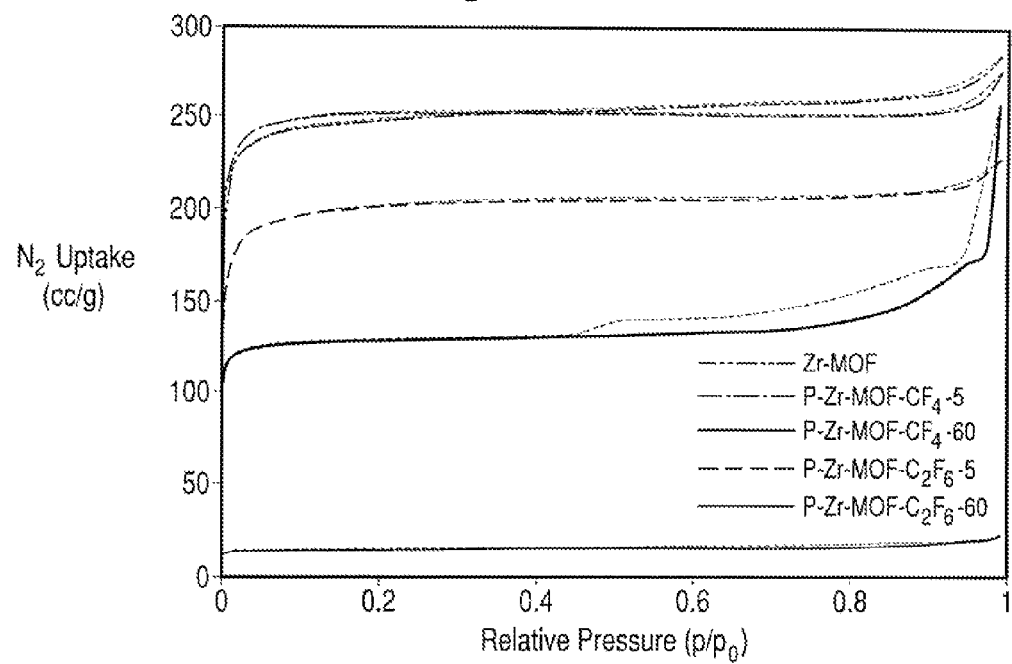

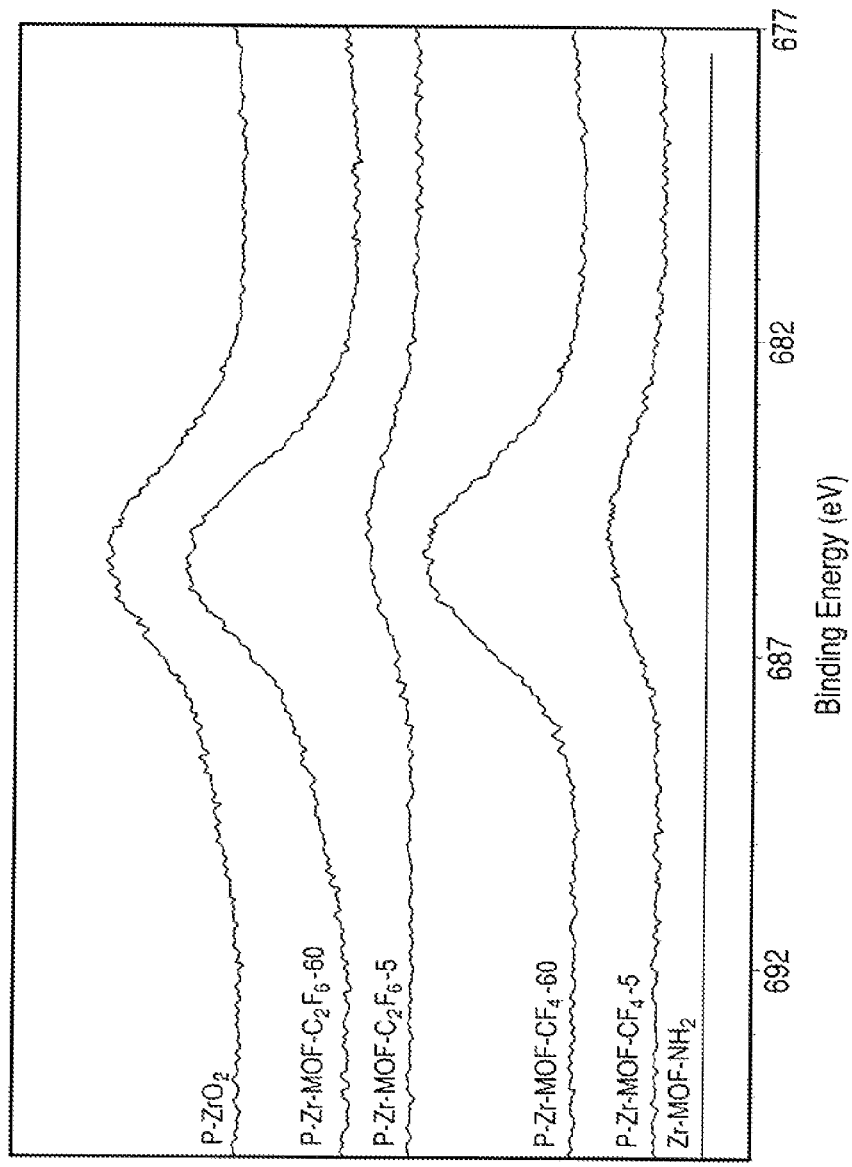

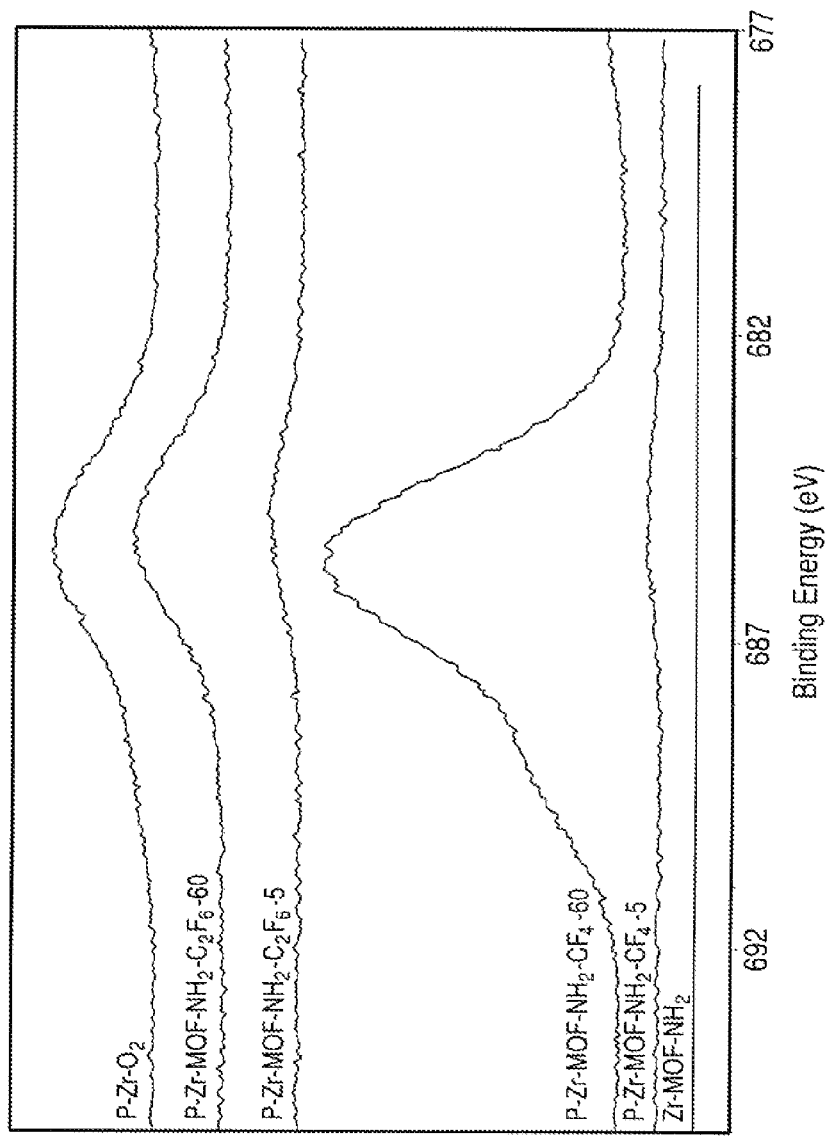

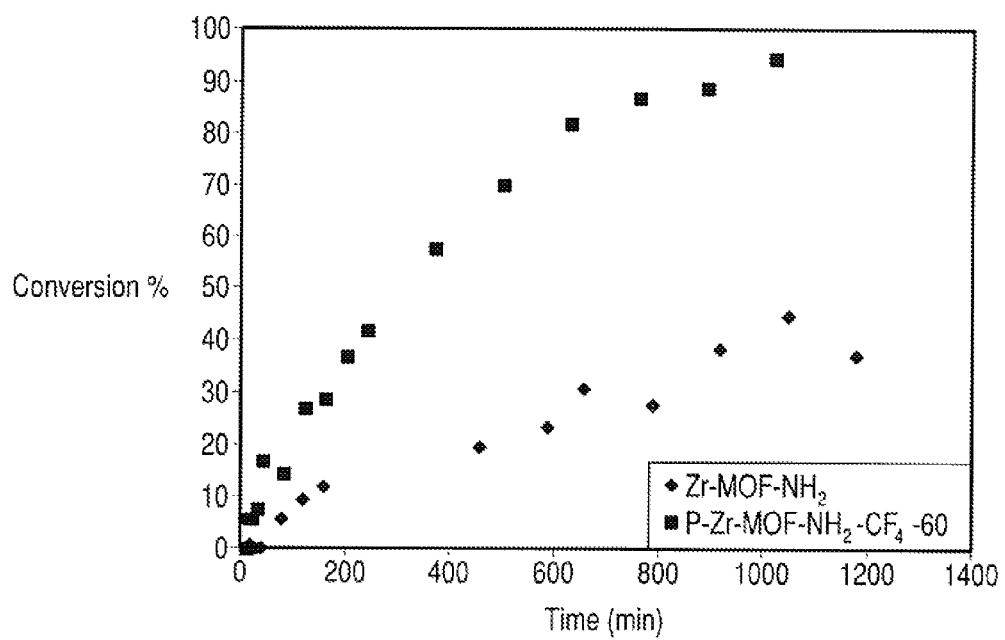

US 9,474,997 B1

METAL-ORGANIC FRAMEWORK SORBENTS HAVING HIERARCHICAL PORE STRUCTURE AND METHOD OF MAKING THE SAME

REFERENCE TO RELATED APPLICATIONS

This application claims priority from U.S. Provisional Application Ser. No. 61/968,592 filed on Mar. 21, 2014.

GOVERNMENT INTEREST

The invention described herein may be manufactured, used, and/or licensed by or for the United States Government.

FIELD OF INVENTION

The invention relates to a porous sorbent, specifically a modified metal-organic framework (herein referred to as MOF), manufactured article comprising same, method of preparing same, and method of using same for gas diffusion, storage and mass transport.

BACKGROUND OF THE INVENTION

Porous sorbents are currently employed in a variety of fields, including gas storage, separations, filtration, catalysis, and others. The ability to introduce active sites onto sorbents that are capable of reaction with both acidic and basic gases continues to be an area of interest. Such sorbents are incorporated into respirators used by emergency and/or military personnel to remove toxic chemicals. For example, the National Institute for Occupational Safety and Health (NIOSH) requires chemical, biological, radiological, and nuclear (CBRN) filters to provide protection against a wide variety of gases, including ammonia ($NH_3$), chlorine gas ($Cl_2$), and cyanogen chloride (CNCl). Current military and commercial individual (small) and collective (large—building/vehicle) filters employ activated, impregnated carbon. Although carbon is typically an excellent material for removing highly toxic chemicals such as nerve, blister, blood, and choking agents, there are shortcomings with gases beyond those toxic chemicals.

To this end, metal-organic frameworks (MOFs) have been intensely studied for a variety of potential applications, including gas storage, catalysis, separations, and toxic gas removal. MOFs are crystalline materials built using metal containing secondary building unit (SBU) clusters and organic linkers, which can be functionalized. The ability to change the SBU and organic linker allows for a large potential number of combinations and therefore performance and properties. Many MOFs are inherently microporous; however, the linkers can be extended or templates can be used to make mesoporous MOFs. Micropores refer to pore sizes less than 2 nanometers, while mesopores refer to pore sizes between 2 and 50 nanometers. The ability to incorporate multiple functionalities into the backbone of MOFs is a major advantage over traditional activated, impregnated carbons. However, for use in filtration and other applications where diffusion kinetics are important, a wide range of pore sizes are sometimes required. Micropores are necessary for high-energy adsorption sites, while mesopores and macropores are required for transport from the bulk (air) phase to the active sites.

One potential shortcoming of MOFs is that they are almost exclusively microporous, and in dynamic separations, small pore apertures may lead to reduce mass transfer. Attempts to make isostructural MOFs with larger pores has proven successful with extension of the organic linker. However, the modification may lack sufficient stability and does not possess a hierarchical pore structure. Other MOFs have been synthesized with mesopores, many of which require the use of a templating agent. Only a few, if any, MOFs possessing a hierarchical combination of micropores and mesopores are known. Furthermore, there is a long felt need for a post-synthetic method to develop a hierarchical pore structure within MOFs.

SUMMARY OF THE INVENTION

The invention is directed to a porous sorbent comprising a modified MOF, its use, and the method to produce thereof. The MOF is post-synthetically modified with a plasma consisting of air and/or fluorocarbons, and/or other sources of fluorine and/or other halogens. The modified MOF surprisingly retains its crystal structure. The modified MOF also enhances diffusion of absorbed mediums as compared to unmodified MOF.

BRIEF DESCRIPTION OF THE DRAWINGS

For a full understanding of the native and advantages of the present invention, reference should be made to the following detailed description read in conjunction with the accompanying drawings.

FIG. 2A illustrates nitrogen isotherm data for untreated functionalized MOFs and treated functionalized MOFs.

FIG. 2B illustrates pore size distribution for untreated functionalized MOFs and treated functionalized MOFs.

FIG. 3A illustrates nitrogen isotherm data for untreated MOFs, and treated MOFs.

FIG. 4A illustrates the Fluorine 1s XPS spectra for untreated and treated MOFs.

FIG. 4B illustrates the Fluorine 1s XPS spectra for untreated and treated functionalized MOFs.

FIG. 8 illustrates conversion/adsorption of VX to EMPA for untreated and treated functionalized MOFs.

DETAILED DESCRIPTION OF THE INVENTION

Figure 1:
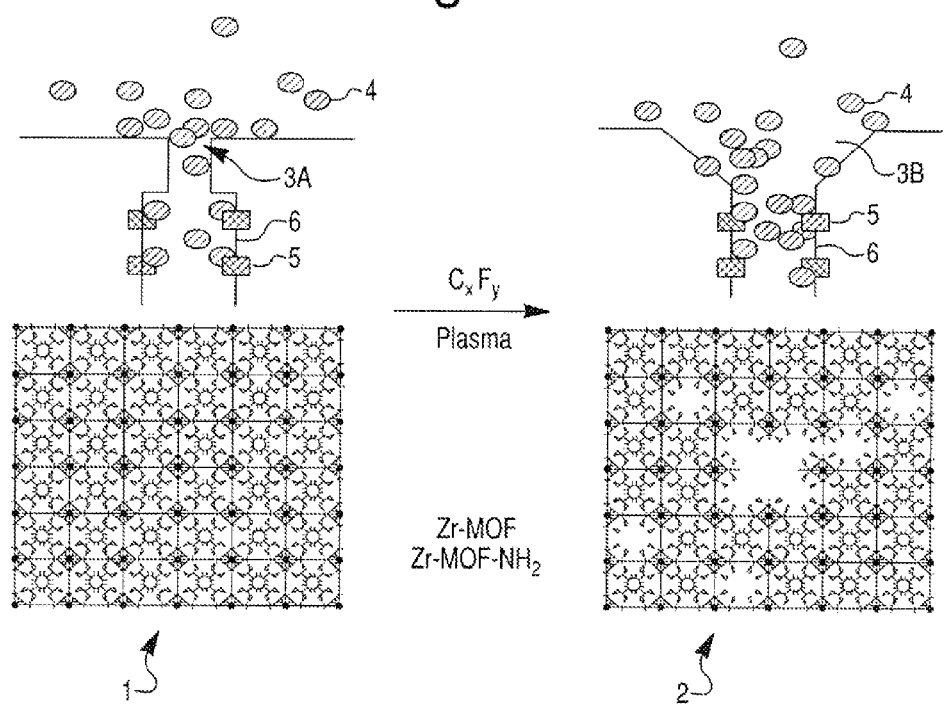
FIG. 1 illustrates the structure of an unmodified MOF, which was then modified by plasma using fluorocarbons to create mesopores.

This invention is directed to a porous sorbent comprising a modified metal-organic framework. The MOF is modified by plasma-enhanced chemical vapor deposition with air, fluorocarbons, or other sources of fluorine or halogens. The modified MOF, while surprisingly retaining its crystal structure, also contains a mixture of micropores and mesopores.

Specifically, at least one source of halogen or preferably fluorine etches the modified MOF to create mesopores. The modified MOF also enhances diffusion of absorbed mediums as compared to an unmodified MOF. Further, due to the mesoporosity resulting from the plasma-etching, the modified MOF is effective in retaining and removing toxic chemicals from the environment, or converting toxic chemicals such as VX to less toxic forms.

It is noted that for the present invention, the terms "cornerstone brick" or "cornerstone" are interchangeable with a secondary building unit ("SBU"). These terms refer to inorganics, preferably metals or metal oxides that form the core of the MOF and are linkable to one another via an organic linker to form the lattice or crystal structure of MOF.

It is also noted that for the present invention the MOF broadly encompass, or is alternatively referred to as zeolitic inorganic framework ("ZIF") iso-reticular metal organic framework (IRMOF), Universitetet i Oslo (UiO), and Materials Institute Lavoisier ("MIL"). Further, the present invention encompasses plasma etched ZIF, IRMOF and MIL for the purpose of gas and liquid mass transport.

Metal Organic Framework

In the synthesis of a new MOF, the stability of the framework is mainly controlled by the inorganic brick or SBU and the strength of the chemical bonding between the SBU and the linkers. Identification of stable, flexible, new inorganic SBUs is therefore of most importance for the development of new, stable, open hybrid structures.

A MOF of the present invention comprises a plurality of units SBUs or metal-coordination-polyhedra, and ligands (linking moieties). The ligands are polydentate to allow the formation of a one-, two-, or three-dimensional extended structure (e.g. terephthalic acid or imidazole). The SBU of the present invention contain a cluster with formula $M_wO_x(OH)_y$ cluster and bridged by carboxylates ($—CO_2$) originating from the dicarboxylic acid, forming a $M_wO_x(OH)_y(CO_2)_z$ cluster, wherein w=1-10, x=0-10, y=0-10 and z=2-20. M is a metal selected from the group consisting of Al, Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re. Os, Ir, Pt, Au, Hg, Rf, Db, Sg, Bh, Hs, Ds, Rg, Lanthanides, Actinides, and Uub. Preferably, M is a transitional metal selected from the group consisting of Ti, Cr, Co, Ni, Cu, Zn, Zr, Pd, Cd, Hf and Rf. More preferably, M is a transitional metal selected from the group consisting of Ti, Co, Ni, Zn, Zr, Cd, Hf and Rf. Most preferably, M is a transitional metal selected from the group consisting of Ti, Zr, Hf and Rf, as the Group IV elements interact strongly with oxygen, and are therefore obvious choices for stable inorganic cornerstones in combination with oxygen-containing linkers.

Preferably, the transition metal useful for the present invention is zirconium, forming a zirconium-based MOF that is also known as UiO-66, a Zr-MOF that contains 1,4-benzene dicarboxylate (BDC) linkers. The description of this MOF can be found in U.S. Pat. No. 8,653,292 to Hafizovic, which is incorporated herein by reference.

Alternatively, the organic linkers of the transition MOFs of the invention may be any linker molecule or molecule combination capable of binding to at least two inorganic cornerstones and comprising an organic moiety. Thus, the linker may be any of the linkers conventionally used in MOF production. These are generally compounds with at least two cornerstone binding groups, e.g. carboxylates, optionally with extra functional groups which do not bind the cornerstones but may bind other metal ions. The linkers moreover typically have rigidifying groups between the cornerstone-binding groups to facilitate 3D MOF formation. Examples of suitable organic linker compounds include oxalic acid, ethyloxalic acid, fumaric acid, 1,3,5-benzene tribenzoic acid (BTB), benzene tribiphenylcarboxylic acid (BBC), 5,15-bis (4-carboxyphenyl) zinc (II) porphyrin (BCPP), 1,4-benzene dicarboxylic acid (BDC), 2-amino-1,4-benzene dicarboxylic acid ($R_3$-BDC or $H_2N$ BDC), 1,1'-azo-diphenyl 4,4'-dicarboxylic acid, cyclobutyl-1,4-benzene dicarboxylic acid ($R_6$-BDC), benzene tricarboxylic acid, 2,6-naphthalene dicarboxylic acid (NDC), 1,1'-biphenyl 4,4'-dicarboxylic acid (BPDC), 2,2'-bipyridyl-5,5'-dicarboxylic acid, adamantane tetracaboxylic acid (ATC), adamantane dibenzoic acid (ADB), adamantane teracarboxylic acid (ATC), dihydroxyterephthalic acid (DHBDC), biphenyltetracarboxylic acid (BPTC), tetrahydropyrene 2,7-dicarboxylic acid (HPDC), hihydroxyterephthalic acid (DHBC), pyrene 2,7-dicarboxylic acid (PDC), pyrazine dicarboxylic acid, acetylene dicarboxylic acid (ADC), camphor dicarboxylic acid, fumaric acid, benzene tetracarboxylic acid, 1,4-bis(4-carboxyphenyl)butadiyne, nicotinic acid, and terphenyl dicarboxylic acid (TPDC). Other acids besides carboxylic acids, e.g. boronic acids may also be used. A mixture of linkers may be used to introduce functional groups within the pore space, e.g. by using aminobenzoic acid to provide free amine groups or by using a shorter linker such as oxalic acid. This introduction of functionalized linkers is facilitated since the transition MOFs have excess inorganic cornerstone coordination sites beyond those required to form the stable 3D MOF structure.

Thus viewed from one aspect the invention provides an etched MOF having a surface area of at least 50 $m^2/g$, especially at least 500 $m^2/g$, particularly at ea 100 $m^2/g$, for example at least 1200 $m^2/g$, or at least 3000 $m^2/g$.

The transition MOFs of the invention particularly preferably have a cornerstone having at least 4 coordination sites for the organic linkers, e.g., 4 to 40, preferably 10 to 40, especially preferably at least 15 to 36, most preferably 20 to 36. In this way at least 6, more preferably at least 10 polydentate ligand groups of the organic linkers can bind to each cornerstone. Especially preferably the cornerstone is a $Zr_6O_6$ or $Zr_6O_4(OH)_4$ structure, which coordinated to 12 organic linkers per cornerstone.

Viewed from another aspect the invention provides a MOF having a metal atom to organic linker molecule ratio of from 1:0.45 to 1:0.55, especially 1:0.49 to 1:0.51, particularly 1:0.5, and preferably having a surface area of at least 50 $m^2/g$, etc. as above. Other preferred metal atom to organic linker molecule ratios are about 0.5:1, about 1:1, about 3:1 and about 1:3.

Viewed from another aspect the invention provides an etched and functionalized transition MOF, especially Zr-MOF having a surface area of at least 50 $m^2/g$, especially at least 200 $m^2/g$, especially at least 500 $m^2/g$, particularly at least 900 $m^2/g$.

By functionalized MOF is meant a MOF, wherein one or more of the backbone atoms of the organic linkers thereof carries a pendant functional group or itself forms a functional group. Functional groups are typically groups capable of reacting with compounds entering the MOF or acting as catalytic sites for reaction of compounds entering the MOF. Suitable functional groups will be apparent to a person skilled in the art and in preferred embodiments of the invention include amino, thiol, oxyacid, halide and cyano groups or heterocyclic groups (e.g. pyridine), each optionally linked by a linker group, e.g. preferably carbonyl. The functional group may also be a phosphorus- or sulfur-containing acid. The present invention of the functional group is preferably an amino group.

If an acid functional group possesses more than one labile hydrogen, then one or more of said labile hydrogens itself may be substituted leaving one labile hydrogen.

If desired, a precursor to the functional group can be prepared, for example an ether or ester group, or their phosphorous or sulfur equivalents.

The functionalized or unfunctionalized MOFs of the invention will preferably have the cornerstones and/or a metal atom to organic linker molecule ratios referred to above.

MOF construction is effected in solution, typically an organic solvent, for example dimethylformamide (DMF), using a soluble precursor such as Zr compound and the organic linker and, preferably, in a molar ratio of from 0.6:1 to 3:1, particularly 0.8:1 to 2:1 especially about 1:1. The solution is generally heated, for example to 60 to 150° C., preferably 100 to 140° C., especially 110 to 130° C., particularly 115 to 125° C. (e.g. 80 to 130° C. or 100 to 120° C.). The MOF formation is preferably allowed to occur under static conditions, e.g. for up to 96 hours, especially 12 to 72 hours, particularly 24 to 48 hours, (e.g. for 10 to 30 hours, especially 15 to 19 hours). The use of too long a formation period, e.g. 7 days, or too high a formation temperature (e.g. at or above the upper limits mentioned above) is generally undesirable as the surface area of the resulting MOF tends to be reduced. Alternatively, no solvent is necessary for constructing the MOF, and the general conditions such as heating and the growth period can be modified accordingly. The metal is preferably present in the reaction solution at a concentration of 0.3-2.0 M, especially 0.5-1.0 M, particularly 0.6-0.8 M. The resulting MOF should then be washed with solvent (conveniently the one used for the MOF formation reaction) and thoroughly dried. The surface area can be determined by use of nitrogen adsorption and the BET method. This method, by which the surface areas referred to herein may be determined, is described by Rouquerol et al in "Adsorption by powders and porous solids", Academic Press, San Diego, Calif., USA, 1999.

The solvent used is conveniently an alcohols, dimethyl formamide (DMF), toluene, methylethyl ketone (MEK), dimethylsulfoxide (DMSO), tetrahydrofuran (THF), cyclohexanone, diethyl formamide (DEF), N-methyl pyrridone, acetone, an alkane, pyridine or acetonitrile. The use of DMF is especially preferred.

The metal salt used is preferably a halide (e.g. the chloride), an alcoholate, a nitrate, or an acetonate. The metal may, if desired, be present in such a reagent as an oxide cation.

The MOFs of the present invention are particularly suitable for containing gases or liquids due to their very high surface area and stability. The types of gases of interest are principally toxic gases such as ammonia or cyanogen chloride; however, other gases may be adsorbed and, under raised temperature or reduced pressure, desorbed—thus, they can also be used to capture gaseous contaminants or to hold other gases such as, for example, hydrogen, methane, acetylene, nitrogen, carbon monoxide, oxygen, or carbon dioxide. The types of liquid of interest are biologically toxic such as sulfur mustard, sarin and VX. Other uses include separations of isomers, organics, and other chemicals.

Alternatively, the MOFs of the present invention may also be used as catalysts, either relying on the catalytic activity of Zr, by using linkers with catalytic activity or by loading the MOF with a catalyst, e.g. a material which is simply absorbed into the MOF or which will bind to free functionalities on the organic linkers in the MOF. Catalyst loading and subsequent reagent loading may be performed in conventional fashion. Thus viewed from a further aspect, the invention provides a catalyzed process for reacting a reagent to produce a product, characterized in that as the catalyst or catalyst carrier is a modified MOF of the present invention. Viewed from another aspect the invention provides the use of a MOF as a catalyst or catalyst support. Viewed from a still further aspect the invention provides a transition MOF material having catalytic activity. Performance of catalyzed reactions within porous structures is known to allow great reaction specificity and the transition MOFs may advantageously be used to this end.

IRMOF, ZIF and MIL

For the purpose of the present invention, IRMOF, ZIF and MIL may also be functionalized and/or etched to create mesopores, while having their internal structures substantially intact. Specifically, MIL is a subset of MOF and can be alternatively referred to as MOF.

An isoreticular metal-organic framework ("IRMOF") according to the disclosure comprises a plurality of SBUs, each of the plurality of SBUs comprises, for example, an $M_4O(CO_2)_6$ cluster. A compound links adjacent SBUs, the linking compound comprising a linear ditopic carboxylate having at least one phenyl group and/or at least one functional group X attached to at least one phenyl group. The IRMOF formed has substantial permanent porosity.

M in the SBU is a metal cation. For example, the metal cation can be selected from the group consisting of a beryllium, zinc, cadmium, mercury, and any of the transition metals (in the periodic table, Group IV metals, scandium through copper, yttrium through silver, lanthanum through gold, and all known elements from actinium on).

Particularly, IRMOF comprises a reactive side group, X, that can bond (either covalently, ionically or through hydrogen bonds with a gas analyte). In one embodiment the reactive side group is a Lewis Acid or base group.

The ZIF family of materials follows the same building principles as other MOF, but the ligands are chosen from organic molecules with imidazolate moieties (e.g., imdazolate, benzimidazolate, adenine, cytosine and so on), the metal coordination polyhedra typically contains one metal ion (e.g., Zinc(II)) and is a tetrahedron. These materials resemble topologies found in inorganic zeolites and are able to generate topologies which were not yet observed in inorganic zeolites. One feature that makes this class of material a useful mass transport is its stability towards a vast variety of solvents The zeolitic frameworks comprise a network of homogenous transition metal or heterogeneous transition metals linked by a homogenous or heterogeneous linking moiety. The zeolitic frameworks of the present invention comprises any of the networks currently defined in the Atlas of Zeolite Structure Types known in the literature as well as POZ. The zeolitic frameworks of the present invention provide nanoporous structure useful for filtration, gas storage and the like, as more fully described herein.

The present invention also provides a general synthesis of structures having zeolite framework topologies in which all tetrahedral atoms are transition metals, and the linking moieties comprise organic linkers comprising nitrogen, sulfur or oxygen organic molecules (e.g., such as imidazolate (IM) units). The organic linkers may be further functionalized to modify the cage size and pore size or specificity to a guest species or gas molecule.

ZIFs comprise the general structure M-L-M, wherein M comprises a transition metal and L is a linking moiety.

Overall, MOFs, including IRMOFs, MILs, and ZIFs, are porous frameworks that can be functionalized to bind and interact with various analytes including, but not limited to, ammonia, carbon dioxide, carbon monoxide, hydrogen, amines, methane, oxygen, argon, nitrogen, organic dyes, polycyclic organic molecules, toxic agents, and combinations thereof. The diversity of the MOFs of the disclosure comprising a porous framework material can be increased by combining the framework with additional material (e.g., conductive polymers, insulators and the like).

A detailed description of MOFs, IRMOFs, and ZIFs can be found in U.S. Pat. No. 8,735,161 to Yaghi, which is incorporated herein by reference.

Plasma Etching

The present invention utilizes gas etching, specifically plasma etching on the MOF to create mesopores within the MOF, and surprisingly leaving the crystal structure of the modified MOF substantially intact. Plasma etching is a form of surface treatment in which larger quantities of material are impacted and removed. Plasma etching leads to a deep structuring of the surface. Reactive ions that are created within the plasma react with surface atoms. The resultant volatile side products are removed from the chamber with the plasma gas. The plasma etching process can be modified further by adding activated neutral (uncharged) molecules to the process. The exact mechanism of how fluorocarbon etches a target material is described in detail by Diener electronic GmbH: diener plasma-surface-technology: Plasma Technology, which is incorporated herein by reference.

Plasma enhanced chemical vapor deposition had previously been performed on CuBTC MOF with perfluorinated precursors, and resulted in a highly hydrophobic material resistant to degradation from moisture. In general, using a perfluorinated precursor results in the formation of F and $CF_x$ (x=1-3) radicals/species and other radicals/ions that are highly active and will deposit on a surface or interact with a substrate.

Without wish to be bound by theory, it is believed that a treatment of perfluoroalkanes breaks transition metal-O, especially Zr—O, bonds to form mesoporous structures of the MOF. This process is tunable such that the duration of treatment and power of plasma at different levels affect the pore size and surface area of the target MOF. The fluorocarbon precursor is selected from, but not limited to, the group consisting of $CF_4$, $CF_3H$, $CF_3Cl$, $CF_2Cl_2$, $CCl_4$, $C_2F_6$, $C_4F_6$, $C_4F_8$, and mixtures thereof. The fluorocarbon precursor is preferably $CF_4$ or $C_2F_6$. The plasma fluorocarbons may be mixed with an inert gas such as $N_2$, Xe, Ar, Ne, He and Kr, or air, prior to etching a targeted MOF.

Accordingly, viewed from a further aspect, the invention provides the use of an etched MOF to retain or absorb a biologically toxic gas or liquid. Viewed from a further aspect the invention provides a gas or liquid container, or processing unit e.g. detoxification units such as pumps, respirators, gas masks or filters containing the etched MOF; a fuel tank for a motor vehicle, a storage tank or sealable vessel containing the etched MOF. Viewed from a further aspect, such devices may be constructed in conventional fashion.

The modified or etched MOF contains embedded fluorine and has an atomic ratio of F to M in the range of 0.1 to 12, preferably 0.2 to 10, more preferably 0.5 to 9. Alternatively, fluorine may be entirely removed by washing the etched MOF, rehydrate the etched sites to induce hydrolysis of chemicals. The modified MOF contains at least 1% mesopore volume, preferably at least 20% mesopore volume, and more preferably 30% mesopore volume. The pores are greater than 20 Å or 2 nanometers in size, preferably greater than 50 Å or 5 nanometers in size, and more preferably greater than 100 Å or 10 nanometers in size. Further, the modified MOF has a micropore volume of 40-90%, preferably 45-80%.

As shown in FIG. 1, Sample 1 (representing both untreated Zr-based MOF and untreated Zr-based functionalized MOF) has a crystal structure 6 with cornerstones or SBU 5 having micropore 3A, allowing a few gas particles 4 to enter the MOF. After the plasma etching by perfluorocarbons, the modified MOF Sample 2 has mesopore 3B that allows for greater access of gas particle 4 into modified MOF 2, while the lattice structure 6 anchored by cornerstones 5 is substantially intact.

EXAMPLE 1

Two sets of MOFs were produced. The porosity, structure, and surface area of the MOFs were measured to ascertain the effects of plasma etching with fluorocarbons on the MOFs.

Zr-BDC MOF

Zr-MOF linked by BDG was synthesized by dissolving $ZrCl_4$ (0.053 g, 0.227 mmol, Aldrich) and 1,4-benzenedicarboxylic acid ($H_2BDC$) (0.034 g, 0.227 mmol, Aldrich) in N,N'-dimethylformamide (DMF) (24.9 g, 340 mmol) at ambient temperature. The mixture was sealed and placed in a pre-heated oven at 120° C. for 24 hours. Crystallization was carried out under static conditions. After cooling in air to ambient temperature the resulting solid was filtered, repeatedly washed with DMF and dried at ambient temperature. Samples were activated under vacuum at approximately 100-150 C before plasma treatment.

Zr-BDC-MOF-$NH_2$

A Zr-MOF functionalized with $NH_2$ (Zr-MOF-$NH_2$) was prepared using zirconium tetrachloride, 2-aminoterephthalic acid, water and dimethylformamide. The metal salt was purchased from Alfa Aesar and the rest of the chemicals were purchased from Sigma Aldrich. The molar composition of the reaction is 1 $Zr^{4+}$:1 Acid:3.17 $H_2O$:297 DMF. 400 mL of DMF and 2 mL of DI $H_2O$ were added slowly to 8.12 g of $ZrCl_4$ in an Erlenmeyer flask (gases are produced upon addition of solvent). In a separate Erlenmeyer flask, 400 mL of DMF was added to 6.275 g of 2-aminoterephthalic acid. Both mixtures were stirred until completely dissolved. The solutions were then mixed together and heated by microwave irradiation in sealed vessels at 1500 W for 2 and 9 hours at 120° C. Both reaction times produced the final product. The resulting pale yellow powder was filtered and extracted with methanol in a Soxhlet extractor overnight. The final product was dried in air and then baked in an oven at 65° C. The material was characterized by PXRD and $N_2$ isotherm measurements. For nitrogen adsorption studies, the material was activated at 150° C. under vacuum overnight. Samples were activated under vacuum at approximately 100-150 C before plasma treatment.

Alternatively, the Zr-MOF-$NH_2$ can be made with the method as described in Example 7 of U.S. Pat. No. 8,653, 292 to Hafizovic, which is incorporated herein by reference.

A subset of Zr-MOF and Zr-MOF-$NH_2$ was etched by plasma treatment using fluorocarbons, while second subset of each type of the produced MOF was not treated by plasma. Specifically, for the plasma treatment, one set was treated with tetrafluoromethane ($CF_4$), and another set was treated with hexafluoroethane ($C_2F_6$).

Plasma Treatment

Plasma etching was conducted using perfluoroalkanes in a Thierry Corporation vacuum Femto system. 0.5 grams of each of the target MOFs was placed in a Pyrex container, and a gas permeable cover was placed over the top of the container to prevent the targeted MOF from escaping during the plasma pulsing. One set of samples was treated with tetrafluoromethane ($CF_4$), and another set of samples was treated with hexafluoroethane ($C_2F_6$). Treatments were conducted at 50 W, for 5 minutes and 60 minutes. The flow rate of the perfluoroalkane precursor was set such that the chamber pressure was constant at 0.3 mbar. The Pyrex container was affixed to a rotating drum such that continuous mixing occurred during the treatment process.

Each of the following sections describes an experimental procedure performed on the plasma-treated MOFs and untreated MOFs.

Nitrogen Isotherm

Nitrogen uptake was measured at 77K using a Micromeretics Tristar system. Samples were off-gassed at approximately 150° C. overnight for approximately 16 hours. Surface area measurements were calculated using the Brunauer-Emmett-Teller (BET) method, and total pore volumes were calculated at a relative pressure of 0.975.

Powder X-Ray Diffraction

Powder X-ray diffraction (PXRD) measurements were taken using a PANalytical X'Pert X-ray powder diffractometer with an X'celerator detector. Samples were scanned at 45 kV and 40 mA, using Cu Kα radiation (λ=1.54 Å), a step size of 2θ=0.033° (10.08 s/step) over the 2θ range of 10-80°. Zero-background discs were used to minimize background scattering. PXRD patterns were processed using the Reflex module in Material Studio 5.5 by Accelrys.

Attenuated Total Reflectance/Fourier Transform Infrared Spectrometry

Attenuated total reflectance Fourier transform infrared spectroscopy (ATR-FTIR) spectra were obtained using a Bruker Tensor 27 FTIR with a Bruker platinum ATR accessory equipped with a diamond crystal. The average of sixteen scans was used at a resolution of 4 $cm^{-1}$. Scans were taken from 4000 to 600 $cm^{-1}$.

X-Ray Photoelectron Spectroscopy

XPS spectra were recorded using a Perkin Elmer Phi 570 ESCA/SAM system employing MgKα x-rays. All binding energies were referenced to the C1s photoelectron peak at 284.6 eV.

Table 1 summarizes the resulting BET surface areas, pore volumes and micropore volume percentages.

TABLE 1

Surface area (SA) and pore volume (PV) of materials

| MOF | SA ($m^2$/g) | PV (cc/g) | Micro PV (%) |
|---|---|---|---|
| Zr-MOF | 992 | 0.44 | 77.3% |
| P—Zr-MOF-$CF_4$-5 | 1015 | 0.43 | 85.7% |
| P—Zr-MOF-$CF_4$-60 | 519 | 0.40 | 45.6% |
| P—Zr-MOF-$C_2F_6$-5 | 792 | 0.35 | 76.4% |
| P—Zr-MOF-$C_2F_6$-60 | 58 | 0.04 | 57.1% |
| Zr-MOF-$NH_2$ | 1,172 | 0.50 | 82.0% |
| P—Zr-MOF-$NH_2$—$CF_4$-5 | 1,122 | 0.45 | 88.9% |
| P—Zr-MOF-$NH_2$—$CF_4$-60 | 507 | 0.35 | 46.2% |
| P—Zr-MOF-$NH_2$—$C_2F_6$-5 | 1,140 | 0.46 | 87.0% |
| P—Zr-MOF-$NH_2$—$C_2F_6$-60 | 609 | 0.39 | 48.7% |

Figure 3B:
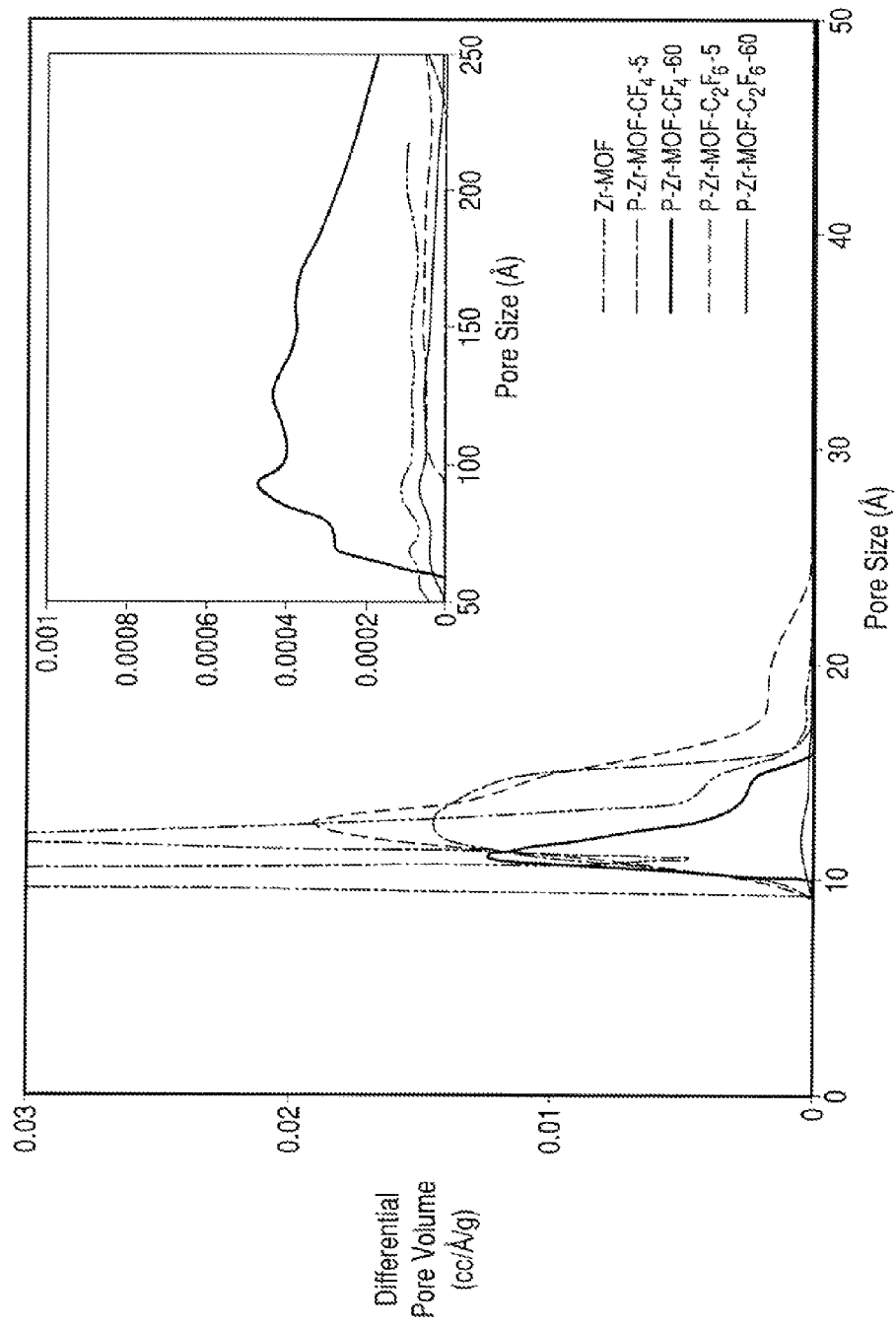
FIG. 3B illustrates pore size distribution for untreated MOFs, and treated MOFs.

FIGS. 2A and 3A show the nitrogen isotherm data for samples that are listed in Table 1. The amount of $N_2$ uptake vs. relative pressure in the Figures indicates a loss in surface area and porosity of about 44-95% upon treatment with perfluoroalkane plasmas, except for some treatments for 5 minutes. Table 1 reiterates the findings in FIGS. 2A and 3A, such that pore size distribution indicates about 26-40% decrease in micropore volume for samples treated for 60 minutes with perfluoroalkane plasmas. However, FIGS. 2B and 3B show at least 10% of mesopore volume presence, and that the mesopores are above 20 Å or 2 nanometers in size. In general, the $CF_4$ precursor results in slightly larger mesopore size than the $C_2F_6$.

X-ray photoelectron spectroscopy (XPS) data were collected to determine the mechanism of mesoporosity development, and of the bonds that were formed and/or broken. The F 1s spectra for Zr-MOF-$NH_2$ and Zr-MOF are shown in FIGS. 4A and 4B. In particular, $ZrO_2$ plasma-treated for 60 minutes with $C_2F_6$ is shown for comparison, as SBUs of Zr-MOF and Zr-MOF-$NH_2$ are comprised of Zr—O bonds. Fluorine peaks are present on all samples, but they are more pronounced on samples treated for longer periods of time. Both the Zr-MOF-$CF_4$ and Zr-MOF-$NH_2$—$CF_4$ samples show Zr—F species formation at 685.4 ev.

The proposed mechanism of mesoporosity development for MOF stems from Zr—O bond breakage from fluorocarbon radicals generated in the plasma, similar to reaction with hydrogen fluoride. As shown in Table 2, with the treatment time of 60 minutes, the F/Zr atomic ratio increased while the O/Zr ratio decreased. The decreased O/Zr ratios indicate a loss of oxygen species due to bond breaking from plasma treatment. Changes to the Zr-MOF-$NH_2$ samples are even more pronounced, in the F/Zr ratio for 60-minute as compared to 5-minute treated samples. Similarly, the O/Zr ratios decrease for the 60-minute treated samples, further supporting the fluorocarbon etching mechanism for mesoporosity development.

TABLE 2

Atomic ratios from XPS data for treated samples

| MOF | F/Zr | O/Zr |
|---|---|---|
| Zr-MOF | — | 5.2 |
| P—Zr-MOF-$CF_4$-5 | 4.5 | 4.6 |
| P—Zr-MOF-$CF_4$-60 | 5.4 | 4.3 |
| P—Zr-MOF-$C_2F_6$-5 | 4.1 | 4.8 |
| P—Zr-MOF-$C_2F_6$-60 | 8.4 | 3.9 |
| Zr-MOF-$NH_2$ | — | 5.1 |
| P—Zr-MOF-$NH_2$—$CF_4$-5 | 0.2 | 5.6 |
| P—Zr-MOF-$NH_2$—$CF_4$-60 | 3.2 | 3.7 |
| P—Zr-MOF-$NH_2$—$C_2F_6$-5 | 0.3 | 5.6 |
| P—Zr-MOF-$NH_2$—$C2F_6$-60 | 1.6 | 4.9 |
| $ZrO_2$ | — | 2.1 |
| P—$ZrO_2$ | 0.8 | 1.9 |

Figure 5A:
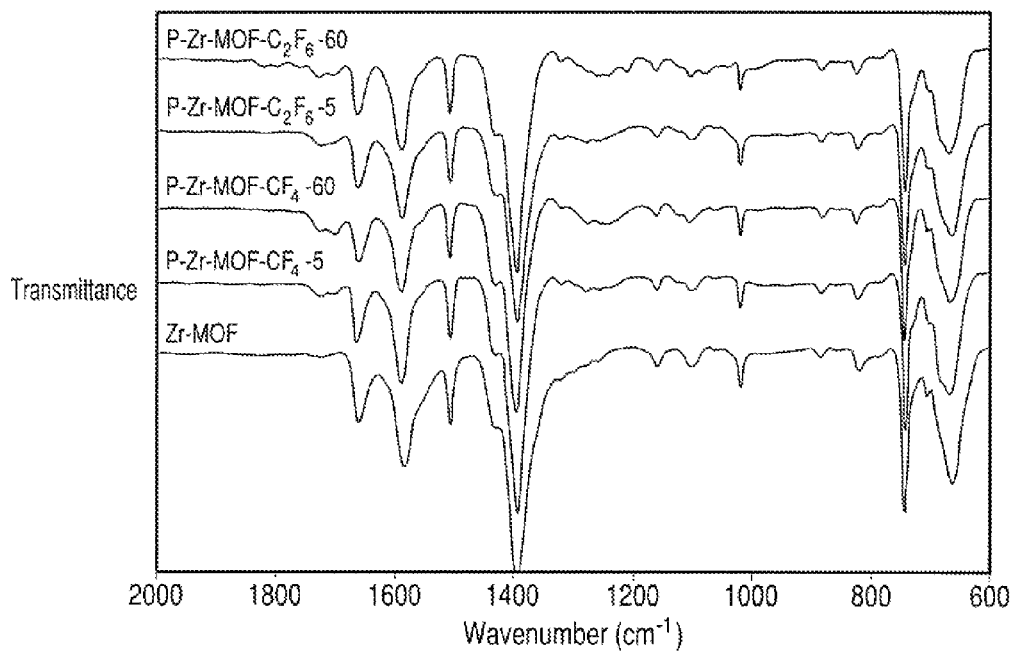
FIG. 5A illustrates the Fourier-transform infrared (FTIR) spectra for untreated and treated MOFs.
Figure 5B:
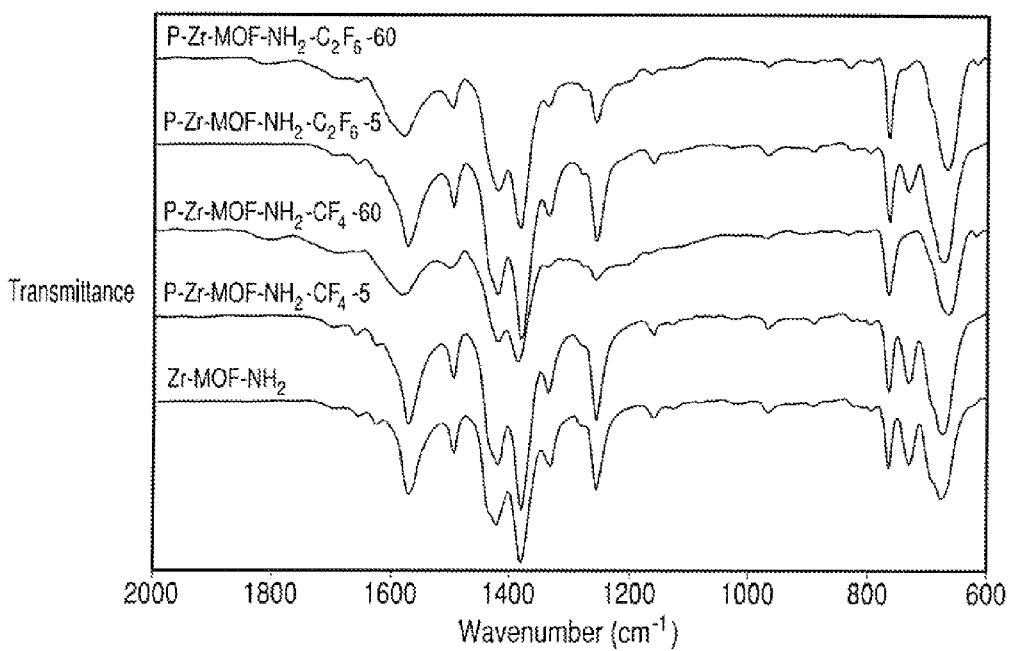
FIG. 5B illustrates the Fourier-transform infrared (FTIR) spectra for untreated and treated functionalized MOFs.

The attenuated total reflectance (ATR) Fourier transform infrared (FTIR) spectroscopy data, shown in FIGS. 5A and 5B, indicates functional changes for both MOFs. When comparing Zr-MOF-$NH_2$ and Zr-MOF-$NH_2$—$CF_4$-60 min, there was the loss of the band at ~730 $cm^{-1}$, while gaining weak bands at v ~914 and 866 $cm^{-1}$ The band at 730 $cm^{-1}$ corresponds to the $\mu_3$-O stretching of the MOF SBU. The $\mu_3$-O holds together the SBUs, and therefore these functional groups were lost as the structure was broken apart. As these bonds broke in the fluorination process, this infrared contribution was lost. The second major feature occurred in the Zr—F stretching region, which is defined by stretches between 1000 and 850 $cm^{-1}$ In this region, new weak bands at ~914 and 866 $cm^{-1}$ are observed. These bands correspond with Zr—F stretches in various zirconium oxyfluoride species. These were likely formed upon the etching by fluorine radicals in the plasma.

Figure 6A:
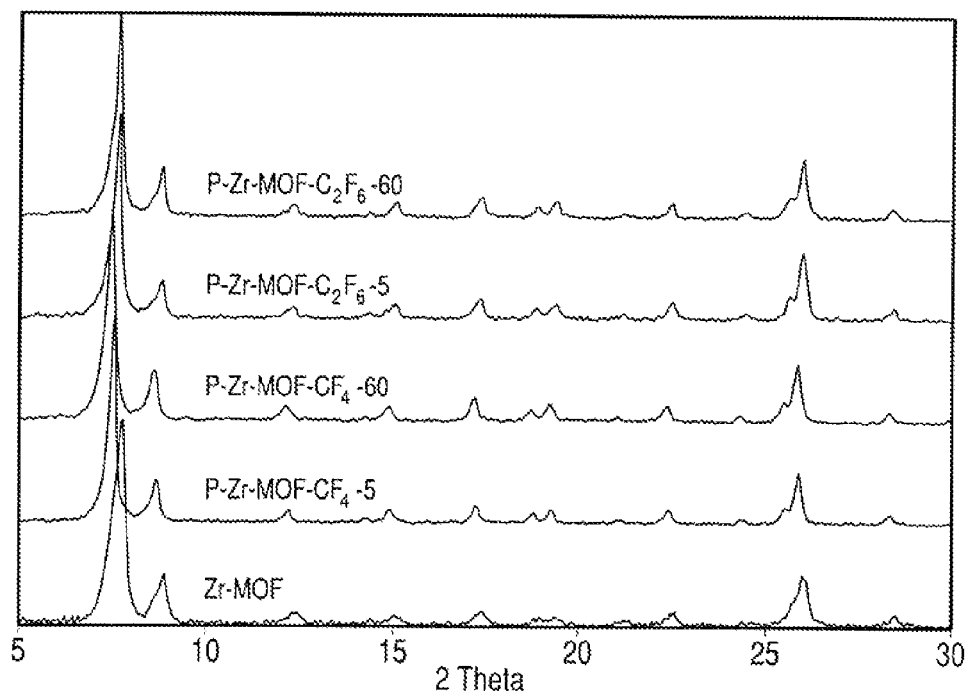
FIG. 6A illustrates the x-ray diffraction (PXRD) pattern for untreated and treated MOFs.
Figure 6B:
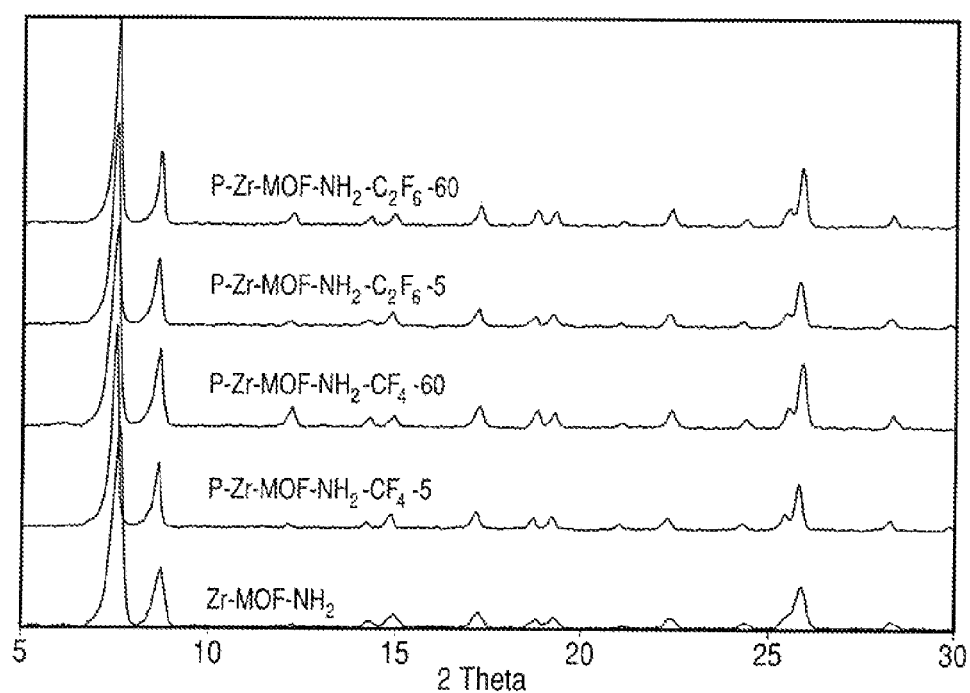
FIG. 6B illustrates the x-ray diffraction (PXRD) pattern for untreated and treated functionalized MOFs.

Although the structure was degrading as seen by nitrogen isotherm data, the powder X-ray diffraction (PXRD) patterns as shown in FIGS. 6A and 6B illustrate that after the plasma treatments, the crystal structure remained intact for each of the MOF and MOF-NH$_2$ samples, with no noticeable differences when compared to untreated Zr-MOF-NH$_2$ and Zr-MOF.

EXAMPLE 2

Figure 7:
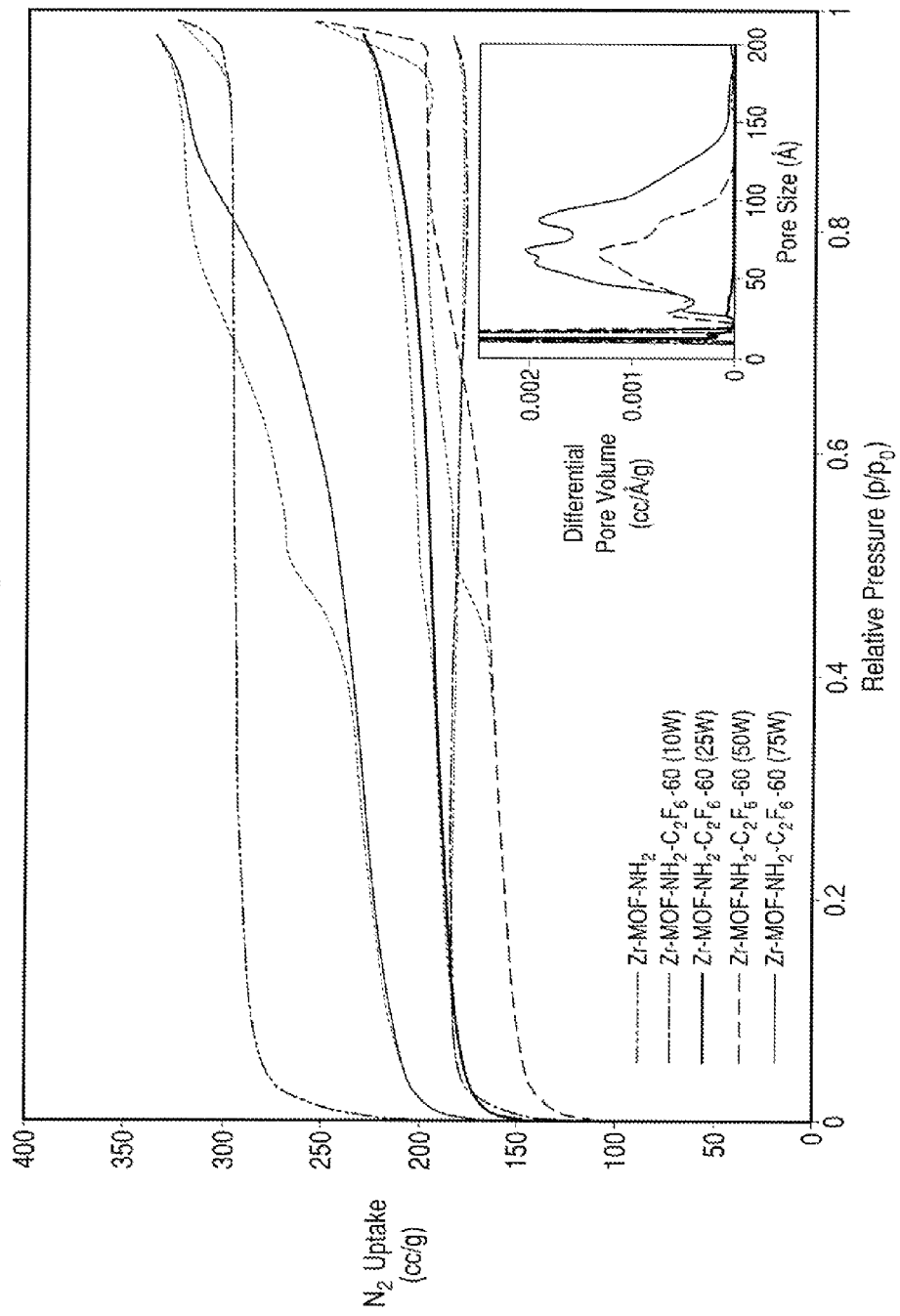
FIG. 7 illustrates nitrogen isotherm for untreated and treated functionalized MOFs for 60 minutes at various power levels.

To study the effect of the different power levels of the plasma has on etching the MOF, plasma treatments were conducted on an additional set of Zr-MOF-NH$_2$ samples at power levels 10 W, 25 W, 50 W and 75 W for 60 minutes. As shown in FIG. 7, at 10 W, overall nitrogen uptake was simply reduced, potentially due to physisorption of C$_2$F$_6$ without the formation of an abundant amount of fluorocarbon and fluorine radicals, and thus the etching of the MOF was insufficient. At 25 W, the resulting surface area is similar to the 10 W sample (Table 3), and some mesoporosity was detected. The 50 W sample shows even more mesoporosity with a decrease in overall surface area. Finally, the sample treated at 75 W shows the most hierarchical pore network of the samples, with a higher total nitrogen uptake that was even greater than the baseline sample. This behavior may be due to different bonds being broken or bonds being broken at different rates at higher vs. lower energies, thus creating a different mesoporous structure.

TABLE 3

Nitrogen isotherm data for MOF-NH$_2$ samples treated at various powers

| MOF | Surface Area (m$^2$/g) | Pore Volume (cc/g) | Micro Volume (%) |
| --- | --- | --- | --- |
| Zr-MOF-NH$_2$ | 1,172 | 0.50 | 82.0% |
| P—Zr-MOF-NH$_2$—C$_2$F$_6$-60 (10W) | 745 | 0.32 | 84.4% |
| P—Zr-MOF-NH$_2$—C$_2$F$_6$-60 (25W) | 735 | 0.38 | 86.8% |
| P—Zr-MOF-NH$_2$—C$_2$F$_6$-60 (50W) | 609 | 0.39 | 48.7% |
| P—Zr-MOF-NH$_2$—C$_2$F$_6$-60 (75W) | 863 | 0.64 | 42.2% |

EXAMPLE 3

To determine the effects of the treatment on mass transport, the baseline Zr-MOF-NH$_2$ and Zr-MOF-NH$_2$—CF$_4$-60 samples were exposed to nerve agent VX. 5 µL of VX were dropped onto approximately 30 mg of each sample, and the reaction was measured by $^{31}$P nuclear magnetic resonance. Conversion vs. time data calculated for both samples are shown in FIG. 8. Without wish to be bound by theory, VX reacts with MOF crystals, as the molecule is approximately the same size as the calculated pore aperture of MOF-NH$_2$, and thus prone to diffusion resistance. Yet, due to the self-catalyzed hydrolysis of VX via the ethyl methylphosphonic acid (EMPA) intermediate, opening up the pore structure likely allows for more-intimate contact between the EMPA byproduct and unreacted VX. The mesoporous structure of the modified MOF also allows for the diffusion of other byproducts away from the main reaction, allowing for the reaction to complete. As shown in FIG. 8, the modification of the pore structure resulted in a 60% reduction in half life, as from 653 min for the baseline Zr-MOF-NH$_2$ to 257 min for the Zr-MOF-NH$_2$—CF$_4$-60 material.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The invention claimed is:

1. A modified metal organic framework having a mixture of micropores and mesopores, wherein said framework has at least 1% mesopore volume and said mesopores are greater than 20 Å.

2. The modified metal organic framework of claim 1, wherein said metal organic framework is selected from the group consisting of ZIFs, IRMOFs, UiOs and MILs.

3. The modified metal organic framework of claim 1, wherein said framework comprises at least two secondary building units, and each of said units contains a metal selected from the group consisting of Al, Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt, Au, Hg, Rf, Db, Sg, Bh, Hs, Mt, Ds, Rg, Lanthanides, Actinides, and Uub.

4. The modified metal organic framework of claim 1, wherein said framework comprises at least two secondary building units, and each of said units contains a metal selected from the group consisting of Ti, Co, Ni, Zn, Zr, Cd, Hf and Rf.

5. The modified metal organic framework of claim 4, wherein said framework comprises at least two secondary building units, and each of said units contains the metal Zr.

6. The modified metal organic framework of claim 1, wherein said framework optionally contains embedded halogen with an atomic ratio of halogen to metal of 0 to 12.

7. The modified metal organic framework of claim 6, wherein said framework has an atomic ratio of halogen to metal of 0.2 to 10.

8. The modified metal organic framework of claim 6, wherein said halogen comprises fluorine.

9. The modified metal organic framework of claim 8, wherein said framework has an atomic ratio of fluorine to metal of 0.2 to 10.

10. The modified metal organic framework of claim 1, wherein said framework has a micropore volume of 40-90%.

11. The modified metal organic framework of claim 1, wherein said framework is functionalized with a functional group selected from the group consisting of amino, thiol, oxyacid, halide and cyano groups or heterocyclic groups.

12. The modified metal organic framework of claim 11, wherein said framework is functionalized with NH$_2$.

13. A method of decontaminating an environment of at least one toxic agent, comprising contacting said toxic agent with a modified metal organic framework having a mixture of micropores and mesopores, and wherein said framework has at least 1% mesopore volume and said mesopores are greater than 20 Å, thereby absorbing and/or converting said toxic agent to remove said toxic agent.

14. The method of claim 13, wherein said toxic agent is selected from the group consisting of sarin, ammonia, sulfur mustard, VX, cyanogen chlorine, chlorine gas, and mixtures thereof.

15. A process of making a modified metal organic framework, comprising: (a) forming a metal organic framework with secondary building units (SBUs) and linking at least two of said SBUs with at least one linker; (b) plasma etching said metal organic framework with a precursor to form a modified metal organic framework containing micropores and mesopores.

16. The process claim 15, wherein said precursor for plasma etching is selected from the group consisting of $F_2$, $CF_4$, $CF_3H$, $CF_3Cl$, $CF_2$, $Cl_2$, $CCl_4$, $C_2F_6$, $C_4F_6$, $C_4F_8$, and air.

17. The process of claim 15, wherein said precursor for plasma etching is selected from $CF_4$, $C_2F_6$, and mixtures thereof.

18. The process of claim 15, wherein said precursor for plasma etching is air or a mixture of air and perfluorocarbon.

19. The process of claim 15, wherein said modified MOF has an atomic ratio of F to metal of 0 to 12.

20. The process of claim 15, wherein said linker is a carboxylic acid.

21. The process of claim 15, wherein said modified MOF has at least 10% mesopore volume and said mesopores are greater than 20 Å.

22. The process of claim 15, wherein said modified MOF has a micropore volume of 40-90%.

23. The process of claim 15, wherein said modified metal organic framework is functionalized with a functional group selected from the group consisting of amino, thiol, oxyacid, halide and cyano groups or heterocyclic groups.

* * * * *